United States Patent
Willars et al.

(10) Patent No.: US 7,680,478 B2
(45) Date of Patent: Mar. 16, 2010

(54) INACTIVITY MONITORING FOR DIFFERENT TRAFFIC OR SERVICE CLASSIFICATIONS

(75) Inventors: Per Willars, Vaxholm (SE); Reiner Ludwig, Hürtgenwald (DE); Göran Eriksson, Norrtalje (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 808 days.

(21) Appl. No.: 11/417,256

(22) Filed: May 4, 2006

(65) Prior Publication Data

US 2007/0259673 A1 Nov. 8, 2007

(51) Int. Cl.
*H04B 1/16* (2006.01)
(52) U.S. Cl. .................. 455/343.2; 455/343.5; 370/477
(58) Field of Classification Search ... 455/343.1–343.4, 455/445–454, 353.5; 370/229, 230, 348, 370/389, 401, 477
See application file for complete search history.

(56) References Cited

U.S. PATENT DOCUMENTS

| | | | |
|---|---|---|---|
| 7,139,246 B2 * | 11/2006 | Harris et al. ................. | 370/252 |
| 7,206,286 B2 * | 4/2007 | Abraham et al. ............. | 370/235 |
| 2003/0236094 A1 * | 12/2003 | Jami et al. .................... | 455/450 |
| 2004/0240383 A1 * | 12/2004 | Davolos et al. .............. | 370/230 |
| 2005/0063304 A1 * | 3/2005 | Sillasto et al. ............... | 370/229 |
| 2006/0109846 A1 * | 5/2006 | Lioy et al. .................... | 370/389 |
| 2007/0037548 A1 * | 2/2007 | Sammour et al. ......... | 455/343.2 |
| 2008/0039032 A1 * | 2/2008 | Haumont .................. | 455/115.1 |

OTHER PUBLICATIONS

3GPP TS 23.107; 3rd Generation Partnership Project; Technical Specification Group Services and System Aspects; Quality of Service (QoS) concept and architecture; (Release 6); V6.3.0 (Jun. 2005).

* cited by examiner

*Primary Examiner*—Blane J Jackson
(74) *Attorney, Agent, or Firm*—Nixon & Vanderhye P.C.

(57) ABSTRACT

Different types of traffic requiring different inactivity timer settings are assigned to different bearers or to different QoS classes. Different inactivity timer settings are established for different traffic types. Individual bearers or individual QoS classes are linked to a corresponding inactivity timer profile. The link may be accomplished in a number of ways. For example, an additional QoS parameter may be employed in a 3GPP QoS profile, or a new QoS class identifier may be mapped to an inactivity timer setting. Different inactivity timer settings allows both UE battery power conservation to be prioritized for some traffic and end-user experience (quick subsequent response times) to be prioritized for other traffic.

27 Claims, 10 Drawing Sheets

INACTIVITY MONITORING FOR DIFFERENT TRAFFIC OR SERVICE CLASSIFICATIONS

TECHNICAL FIELD

The technical field relates to communications, and more particularly, to differentiating the treatment of packet data traffic. One example advantageous application is to cellular communications systems.

BACKGROUND

Signaling in current cellular communications systems (e.g., 3rd Generation Partnership Project (3GPP) based systems) is based on associating a bearer (a logical and/or physical communications channel for communicating information between to points) with a complex Quality of Service (QoS) profile that includes many parameters describing desired QoS characteristics of the bearer. FIG. 1, taken from the 3GPP Technical Specification (TS) 23.107 in the context of Universal Mobile Telecommunications Services (UMTS), shows examples of different layers of bearer services. A bearer service is a communications service that provides the capability for the transmission of signals between access points.

Bearers are realized on several levels in FIG. 1. There is a physical radio bearer service between a Mobile Terminal (MT) and a Radio Access Network (RAN) and a physical bearer service between the RAN and a Core Network (CN) node, like a Serving GPRS Support Node (SGSN). There is a radio bearer service between the MT and RAN, and an access bearer service between the RAN and the SGSN. Also at that level is a backbone bearer service between the SGSN and a CN gateway, like a Gateway GPRS Support Node (GGSN). A Radio Access Bearer (RAB) service extends between the MT and SGSN, and a backbone bearer service extends between the SGSN and the GGSN. There is a Terminal Equipment (TE)-to-MT bearer service, and a UMTS bearer service from the MT to the GGSN. That layer also includes an external bearer service between the GGSN and the other end of the connection TE. The top layer is the end-to-end service between the two TEs.

Between a user equipment (UE) (UE=TE+MT) and the GGSN, a packet data protocol (PDP) context is established, corresponding to the UMTS Bearer Service in FIG. 1. The PDP context is a data structure present on the SGSN, the GGSN, and the UE which contains a subscriber's communication session information when the subscriber has an active communication session herein referred to as a "connection." When a mobile terminal wants to use the bearer services in FIG. 1, it must first attach to the network and then activate a PDP context. The attach procedure allocates a PDP context data structure in the SGSN located where the subscriber is attaching and the GGSN serving the subscriber's access point. The data recorded includes a subscriber's IP address, International Mobile Subscriber Identifier (IMSI), and Tunnel Endpoint ID (TEID) at the GGSN and SGSN. A TEID is a number allocated by the GPRS support node (GSN) (both the SGSN and GGSN are GSNs) which identifies the tunneled data related to a particular PDP context.

A 3GPP QoS profile is employed to define the quality of service provided for a PDP context and a RAB. Accordingly, differentiated treatment of packet data traffic is based on setting up different bearers with different QoS profiles and mapping traffic to these different bearers. There is a movement in 3GPP to replace the relatively complex QoS profile and its numerous QoS parameters with a simpler QoS Class Identifier (QCI). The intent for the QCI is to not include the actual characteristics of a bearer, but instead merely provide a pointer to provisioned (preconfigured) traffic forwarding policies stored and enforced in various nodes that support the bearer (including the Radio Network Controller (RNC)). Accordingly, the QCI is simpler to signal and requires less bandwidth than the QoS profile. And as appreciated by the inventors, the QCI opens up new opportunities to differentiate the traffic in other ways than what is possible with current 3GPP QoS parameters.

During the lifetime of a PDP context and its associated RAB, the mobile radio connection can be operate at different activity level states with respect to the radio resources assigned to it. In UMTS, for example, when a mobile is in a connected mode, it can assume one of four radio resource control (RRC) connection states which define what kind of physical channel a UE is using. In a Cell_DCH state, a dedicated physical channel and/or a shared channel (such as in HSDPA) is allocated to the UE. In a Cell_FACH state, no physical channel is allocated for the UE, but random access channels are used instead. The UE uses less battery power compared to the Cell_DCH state but can listen to the broadcast channel to acquire system information. In a Cell_PCH state, the UE's location is known on a cell level, but it can be reached only via the paging channel. The UE battery consumption is less than in the Cell_FACH state. The URA_PCH state is very similar to Cell_PCH state, except that the UE does not execute cell updates, but instead reads registration area IDs from the broadcast channel. Of the four states, the URA_PCH state uses the least amount of battery power.

The 3GPP specification allows the radio network controller (RNC) in the RAN to control transition between these UE activity states based on the activity level of the radio connection. For example, an inactivity timer could be set for one state. When that timer expires, a radio network controller (RNC) node triggers transition in the UE from a current activity state to a lower activity state. Within certain states, e.g., the Cell_PCH and URA_PCH states in WCDMA, it is also possible to set a longer "sleep mode" (low power) cycle length based on the connection activity. The UE battery consumption is lower with a longer sleep mode cycle.

Inactivity timers are statically configured in the RNC node per UE activity state. If packet data transmission is triggered, the latency (i.e., the response time for the mobile to commence substantive data communication) is longer if the radio connection is in a lower activity state than if it is in a higher activity state. For example, in the Cell_DCH state dedicated radio resources are already assigned to the connection. On the other hand, a significant benefit of a lower activity state is lower battery consumption in the UE. So there is a trade-off between latency and power consumption.

Static settings for inactivity timers depend on the projected associated traffic types. Traffic with QoS requirements of the "Interactive" traffic type has a stricter latency requirement for an inactivity timer setting. Web traffic transactions are an example of interactive traffic and have a higher probability of subsequent, follow-on packet data traffic within a short time period, conditioned on the detection of packet data traffic. For example, if a user starts web browsing, it is probable that a new web page will be loaded after the user reads some part of the web page. Once a browsing session is initiated, the user expects short response times (low latency) for subsequent clicking on web page links. Therefore, an inactivity timer for such interactive traffic should be fairly long, (e.g., longer than the average reading time of a web page), allowing quick response times during the web browsing session. Although all inactivity timers could be set to optimize for such interactive traffic type, the inventors realized that there are other types of traffic that do not have the same requirements.

The inventors recognized that for example message-oriented traffic typically has a lower probability of additional transactions within a short time period conditioned on the detection of a single packet data transmission. This traffic type includes, for instance, push e-mail transactions, IP multimedia sub-system (IMS) subscribe/notify mechanisms (such as presence traffic), machine-to-machine metering communication, or instant messages (IM) like SIP Message as well as pure presence traffic like SIP subscribe/notify. Because the probability of additional transmissions is low, requirements on subsequent response times are not so critical. Accordingly, after transmission of a single packet data burst, the radio connection should soon return to a lower activity state in order to save UE battery power. Consequently, an inactivity timer should be set shorter for message-oriented traffic so that the timeout occurs sooner and the UE can switch to a lower power consumption state. Still, the trade-off for the lower activity level means higher latency (response time), so the user will have to wait longer than for web-type transactional traffic communications.

So a substantial shortcoming with static inactivity timer settings is that traffic with similar QoS requirements is mapped to the same bearer with the same QoS parameters, even though the traffic may have different latency and/or battery power saving requirements when it comes to an inactivity timer setting. A compromise and less than satisfactory inactivity timer setting could be used for all different types of traffic. Alternatively, traffic with similar QoS requirements but different inactivity timer setting requirements could be separated onto different bearers. Unfortunately, there is no parameter in the current 3GPP QoS profile to indicate the characteristics of the traffic for a differentiated inactivity timer setting. A significant problem then is how to differentiate mobile activity state transitions for different traffic types and allow differentiated balancing between requirements on response time/latency, resource usage, and battery power.

SUMMARY

Different traffic types requiring different inactivity timer settings are allocated to different bearers or to different QoS classes. Different inactivity timer settings are established for different traffic types. Individual traffic bearers or individual traffic QoS classes are linked to an associated inactivity timer profile. The link may be accomplished in a variety of ways. For example, an additional QoS parameter may be employed in a 3GPP QoS profile, or a new QoS class identifier (e.g., a QCI) may be linked to an inactivity timer setting. Different inactivity timer settings allow power conservation to be prioritized for some traffic and end-user experience (quick subsequent response times) to be prioritized for other traffic.

Assuming a connection with a mobile radio node has been established, a type of traffic associated with the connection is determined. One of multiple different inactivity time periods is determined based on a type of traffic associated with the connection. Information is then generated regarding the one inactivity time period which can then be used to monitor whether the inactivity time period has expired without any activity for that type of traffic being detected on the connection.

The inactivity time period for the traffic type may be set to balance requirements on response time, resource usage, and power consumption for the traffic type. Example traffic types include a multi-transaction type of activity and a single-transaction type of activity. The inactivity time period for the multi-transaction type of activity is longer than the inactivity time period for the single-transaction type of activity to prioritize lower latency over battery conservation in the UE. Specific examples of multi-transaction traffic types include web traffic, virtual private network (VPN) traffic, IP multimedia core network subsystem (IMS) call control signaling, push-to-talk over cellular (PoC) traffic, e-mail access, or unidentified Internet traffic. Examples of single-transaction type of activity include a push e-mail notification traffic, instant messaging (IM), subscribe and notify traffic, IMS presence traffic, machine-to-machine traffic, tariff metering traffic, or periodic surveillance video traffic.

A protocol parameter may be defined indicating the one inactivity time period. Data traffic carried by the connection is associated with a quality of service class, and a parameter indicating quality of service class, e.g., a quality control indicator (QCI), is used as the protocol parameter indicating the one inactivity time period. The protocol parameter indicating the inactivity time period may be communicated in control signaling used to establish or modify one or more bearers or qualities of service associated with the connection. Alternatively, the protocol parameter indicating the one inactivity time period may be provided in the traffic data packets that are associated with the connection.

At a packet inspecting node, the traffic type may be determined by inspecting the content of packets associated with the connection in a mobile core network and classifying them according to one or more mobile core network operator policies. Alternatively, the traffic type is determined by a policy control node involved in authorizing media flows established by session level signaling for the connection. A policy control node controls the mapping of a specific type of traffic to a bearer (for the GPRS, PDP context). The inactivity time period is determined by a radio access network (RAN) node based on the protocol parameter indication for that bearer. Alternatively, the protocol parameter explicitly indicates a value on the inactivity time period to the RAN node.

The indication of a type of traffic associated with the connection and one of multiple different inactivity time periods may be received at a network node responsible for monitoring inactivity timers. The node determines whether the one inactivity time period has expired without activity of the type of traffic being detected on the connection. If the one inactivity time period has expired, the node sends information for changing a current activity state of the mobile radio to a lower power consuming mobile state. When multiple bearers are established for the connection, the node establishes one of the multiple different inactivity time periods for each bearer in the connection based on a type of traffic associated with each bearer. The node then signals changing the mobile state to a lower power state if associated inactivity timers for all bearers established for the connection have expired.

Another example implementation is in the mobile radio node. The mobile terminal is assumed to be operating in a first activity state. The mobile terminal receives a state change signal from a radio access network based on expiration of an inactivity time period established for a type of traffic associated with the connection. In response to the state change signal, the mobile terminal changes operation from the current state to a lower power consuming state to save battery. The lower power consuming state could be for example a deep sleep mode state, and the current state could be a higher power state used when data is transmitted on the connection. Example states in a non-limiting UMTS context include: cell_DCH, cell_FACH, cell_PCH, and URA_PCH states as described above. The cell_PCH and URA_PCH states may also include a variable sleep mode cycle into which the mobile terminal can switch. In a preferred example, each mobile state is defined according to one or more of the following: a level of radio resources assigned to the connection, a level of power consumption for the mobile terminal, or a delay associated with transition to a mobile state where data transmission can occur.

In another non-limiting example implementation, multiple service classes are established for communicating data with one or more mobile radios. The service classes include quality of service classes or traffic classes. A type of traffic associated with each service class is determined, and an associated inactivity time period is determined for each service class. The associated inactivity time period is monitored to determine whether it has expired without having detected traffic activity for each service class of the connection.

DETAILED DESCRIPTION

In the following description, for purposes of explanation and non-limitation, specific details are set forth, such as particular nodes, functional entities, techniques, protocols, standards, etc. in order to provide an understanding of the described technology. It will be apparent to one skilled in the art that other embodiments may be practiced apart from the specific details disclosed below. In other instances, detailed descriptions of well-known methods, devices, techniques, etc. are omitted so as not to obscure the description with unnecessary detail. Individual function blocks are shown in the figures. Those skilled in the art will appreciate that the functions of those blocks may be implemented using individual hardware circuits, using software programs and data in conjunction with a suitably programmed microprocessor or general purpose computer, using applications specific integrated circuitry (ASIC), field programmable gate arrays, one or more digital signal processors (DSPs), etc.

Figure 1:
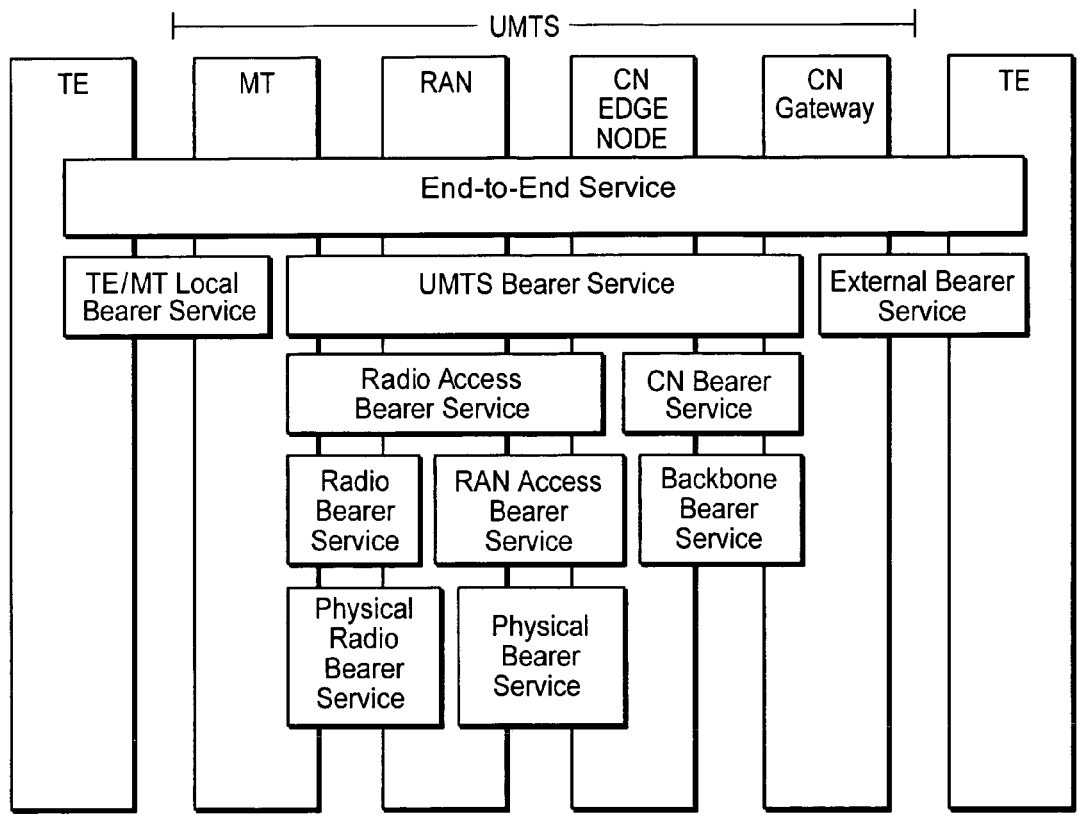
FIG. 1 is a diagram showing different layers of example UMTS bearer services.
Figure 2:
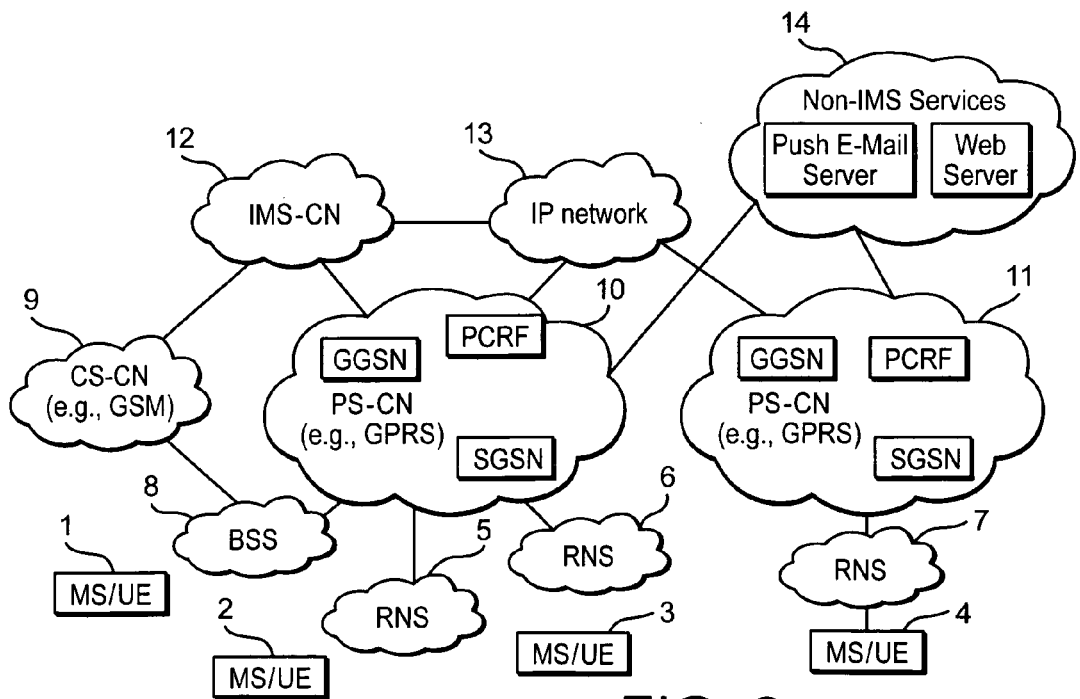
FIG. 2 is a diagram showing an example telecommunications network in which the technology described in this application may be advantageously used.

As telecommunication systems have evolved, services utilizing multimedia transmission have gained more and more ground. The 3GPP IP multimedia core network subsystem (IMS-CN) enables operators a standardized way to offer subscribers multimedia services based on and built upon Internet applications, services, and protocols. Although the following technology may be used in any communication system capable of providing multimedia communication services, an example third generation (3G) mobile communications system is shown in FIG. 1.

A public land mobile network (PLMN) infrastructure may be logically divided into core network (CN) infrastructures 9, 10, 11, 12 and access network (AN) infrastructures 5, 6, 7, 8. An access network may be a base station subsystem (BSS) 8 for GSM and a radio network subsystem (RNS) or radio access network (RAN) 5, 6, 7 for UMTS. In the 3GPP technical specifications, the core network is logically divided into a circuit-switched (CS) domain 9, a packet-switched (PS) domain 10, 11, and an IP multimedia subsystem (IMS) 12. The CS domain refers to a set of all the CN entities offering a CS-type of connection for user traffic as well as all the entities supporting the related CS signaling. A CS connection is a connection for which dedicated network resources are allocated when a connection is established and released when the connection is released. A PS-type of connection transfers the user information using packets so that each packet can be routed independently from the previous one. An example of the PS domain is the General Packet Radio Service (GPRS), and the typical entities may include a serving GPRS support node (SGSN), a gateway GPRS support node (GGSN), and a Policy and Charging Rules Function (PCRF). Also coupled to the PS-CNs is a non-IM Services network 14 that includes a push email server and a web server.

Conceptually, a packet based media communication system is provided on top of the mobile network in order to provide media communication services to the user equipment UE through the communication system. The IP Multimedia Subsystem (IMS) includes core network elements to provide multimedia services. The IMS utilizes the PS domain to transport multimedia signaling and bearer traffic and includes a call session control function (CSCF) that controls multimedia session "flow" procedures. The CSCF functions may be divided, if desired, between a Proxy-CSCF (P-CSCF), an interrogating-CSCF (I-CSCF), and a Serving-CSCF (S-CSCF). The CSCF usually contains a subscriber database to which required subscription data is downloaded when the user terminal registers with the CSCF. The CSCF may also be associated with a Policy and Charging Rules Function (PCRF) in the IMS or outside the IMS.

Figure 3:
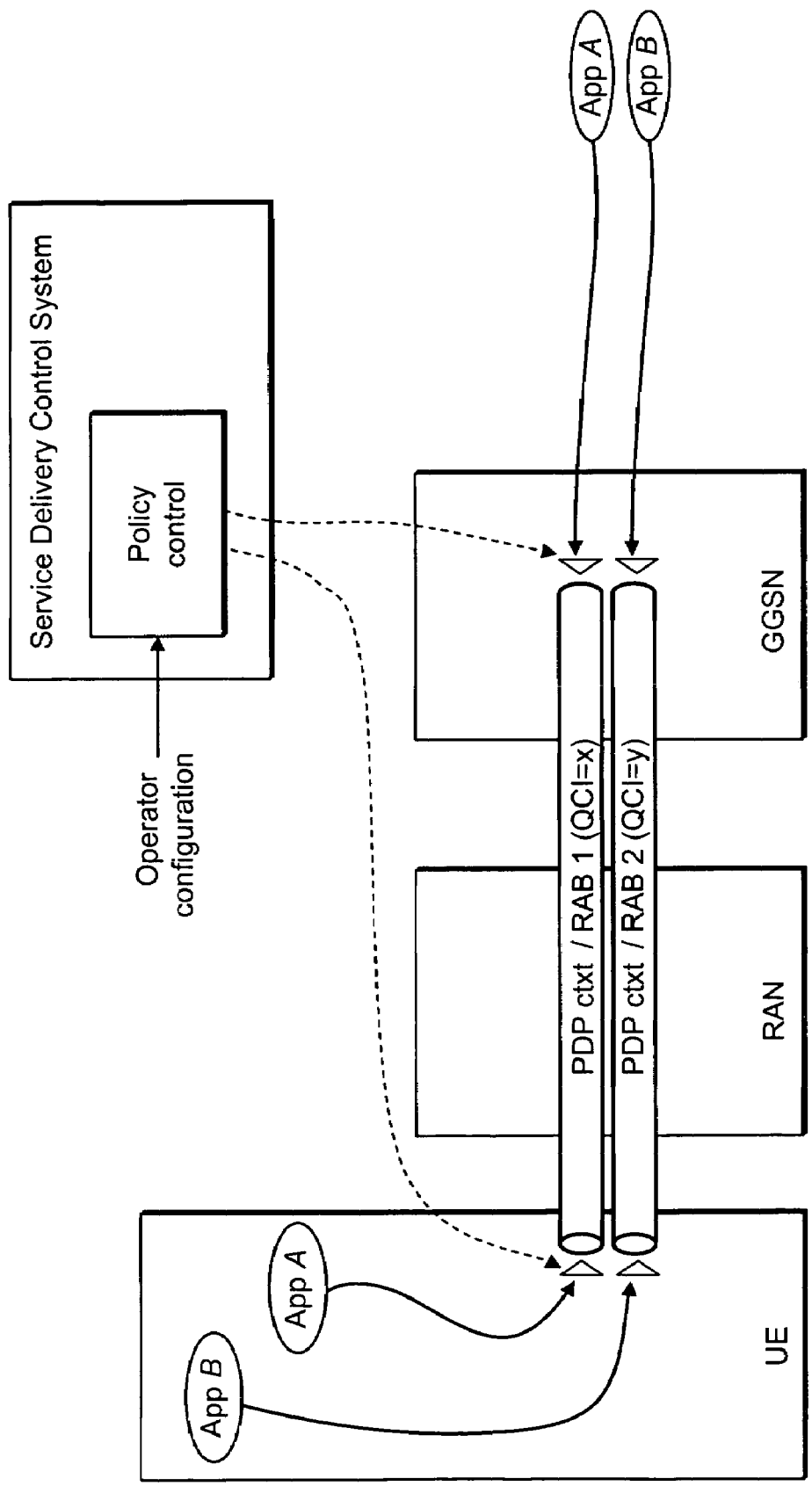
FIG. 3 is a function block diagram showing different PDP contexts and radio access bearers for different applications in a mobile connection.

FIG. 3 illustrates a non-limiting example embodiment for differentiating traffic of different services according to operator policies and for mapping this traffic to different bearers for a multimedia IP connection with the UE. The term UE encompasses any kind of mobile terminal device that is capable of communication over a wireless interface with an access network. The term mobile terminal MT is often used below interchangeably with UE. The bearers are illustrated as "pipes" for conveying packet data between two applications A and B running on the UE with two counterpart applications A and B running on another remote UE (the remote UE) or an application server in the network. (The overall communication between the UE and the network is termed a "connection"). Each bearer corresponds to a PDP context and a radio access bearer (RAB) that are associated with a corresponding QoS Class Indication (QCI). Each bearer's QCI is provided to the radio access network (RAN) at the setup of the bearer. The first bearer PDP context 1/RAB 1 associated with transporting the packet data for application A is established with a first QoS Class Indication (QCI) represented as "x". The second bearer PDP context 2/RAB 2 associated with transporting the packet data for application B is established with a second different QoS Class Indication (QCI) represented as "y".

The policy control of the service delivery control system is in charge of policy control for the various services provided by bearers including policies regarding providing different inactivity time periods for different traffic classes or different services. These policies are configured by an IMS operator. For example, the policy control establishes corresponding QoS policies for each bearer and enforces those QoS policies on traffic transported over the bearer using packet filters configured at relevant nodes. As shown in FIG. 3, the UE and the GGSN each configures a packet filter (illustrated as a triangle) for each bearer to ensure that each bearer only transports the agreed upon traffic. Packet traffic may also be classified via individual packet inspection. In addition to establishing for a bearer typical QoS parameters, like transfer delay, guaranteed bit rate, priority, bit error rate, etc., or only a QCI, the policy control preferably (though not necessarily) establishes different inactivity time periods for different traffic or service classes associated with each bearer. Although the policy control is shown orchestrated from the service delivery control system in the network in FIG. 3, it can be implemented in other places and in various ways, and part of this policy control framework may be distributed to the UE.

Various ways may be used to indicate different inactivity time periods for different traffic or service classes associated with each bearer. One is implicitly signaling the inactivity time period, by signaling a QCI as a "pointer" to a QoS profile preconfigured in the RAN (or elsewhere), and including an inactivity timer setting in the QoS profile preconfigured in the RAN. Another is to explicitly signal the inactivity time period, by adding a new inactivity parameter to the list of QoS parameters signaled when establishing a bearer. For purposes of illustration, a QCI implementation is assumed below unless otherwise stated.

In a preferred but example implementation, the determined traffic/service differentiated inactivity time periods are defined in a new protocol parameter indicating the desired inactivity timer setting in the QoS profile, and the QoS's associated QCI is provided to the radio access network (RAN) where it is mapped to an inactivity timer setting. Different inactivity timers may be implemented in the radio access network (RAN), but other implementations are possible.

Figure 4:
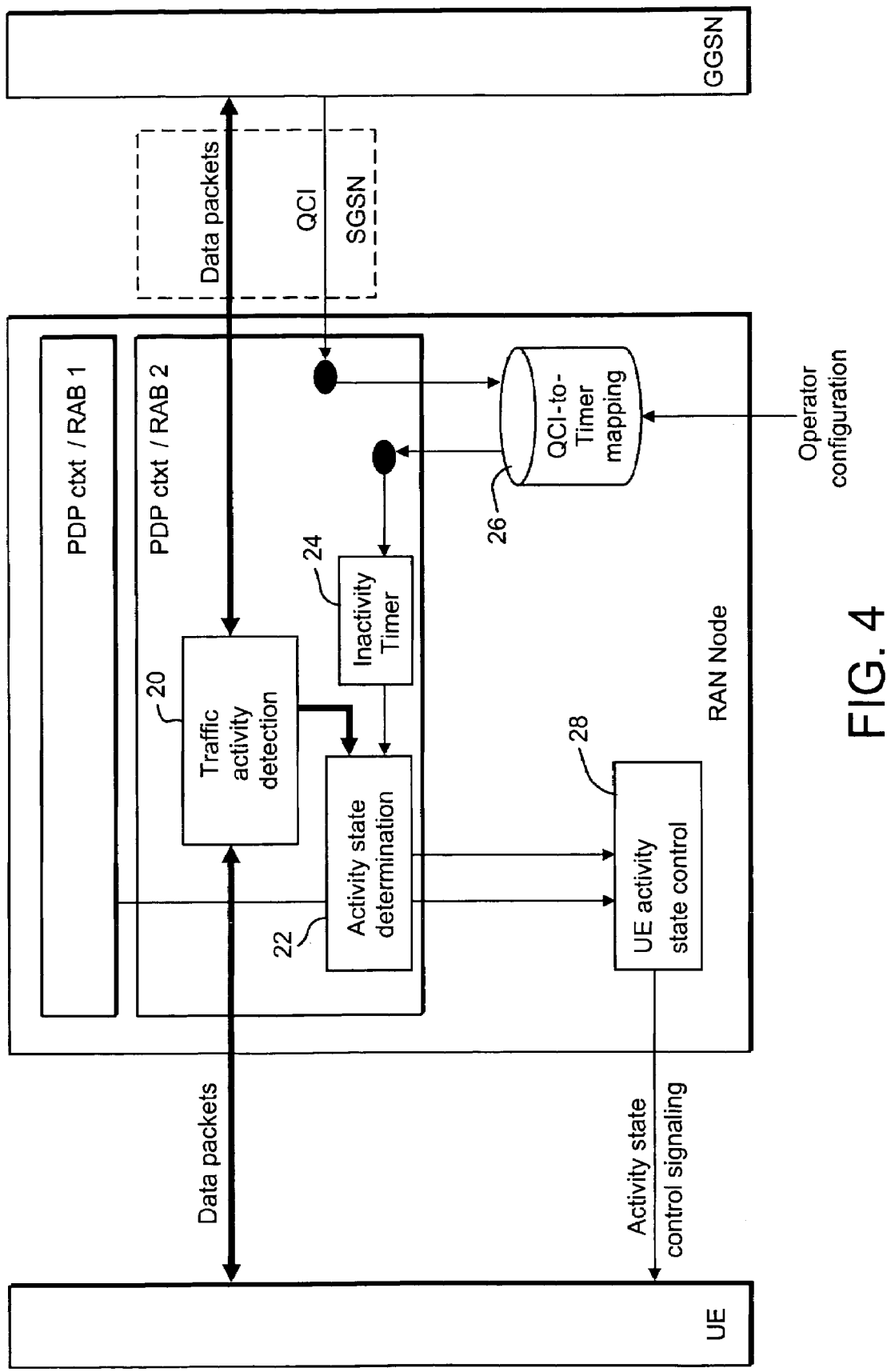
FIG. 4 is a function block diagram showing various entities in a RAN node that may be used to implement the technology in the UMTS example.

FIG. 4 illustrates one example way for a RAN node to implement differentiated traffic/service treatment with regard to activity state control. For WCDMA, the RAN node could be implemented in the RNC. But this functionality could be implemented in the base station (node B) or other node. For each bearer (e.g., PDP context/RAB 2 is highlighted in FIG. 4), a QCI is signaled to the RAN node from a GSN node, shown here as a GGSN. The QCI is used by the RAN node as a pointer to a set of inactivity timer values (one per UE activity state) preconfigured in the RAN node by the operator for each QCI. This is illustrated by the QCI-to-timer mapping database 26 shown in FIG. 4. The QCI-addressed inactivity time period retrieved from the database 26 is then used to set an inactivity timer 24 for the PDP context 2/RAB 2. Although not shown, similar procedures are performed for PDP context 1/RAB 1 but with a different QCI, and presumably, a different QCI-to-timer mapping.

For each bearer, there is also a traffic activity detector 20 and an activity state determination entity 22. The traffic activity detector 20 informs the activity state determination entity 22 of data packet transmission activity on its bearer. The inactivity timer 24 signals to the activity state determination entity 22 when the inactivity time period set for this bearer times out. If the activity state determination entity 22 detects activity on the bearer before receiving a time out from the inactivity timer 24, it resets the inactivity timer 24 with the same inactivity time period value, which restarts the inactivity timer period. But if the activity state determination entity 22 determines that the inactivity timer times out without any detected traffic activity on the bearer, then it signals that a change of UE activity state to a lower activity state is desired for this bearer, to a UE activity state controller 28, shown for example in the RAN node.

For a 3GPP WCDMA example, there are four UE activity states: Cell_DCH, cell_FACH, cell_PCH, and URA_PCH, as described in the background. The Cell_DCH state is intended to have the most transmission activity, and thus, should have a shortest inactivity time period. The cell_FACH state is intended to have less activity than the Cell_DCH state and so has a somewhat longer inactivity time period. The cell_PCH state is intended to have less activity than the cell_FACH state and so has an even longer inactivity time period. The URA_PCH state is intended to have less activity than the cell_FACH state and has the longest inactivity time period of the four UE states.

A variable sleep mode cycle (e.g., a discontinuous reception (DRX) cycle) may also be triggered by a UE state change based on an expired inactivity time period in applicable UE states, e.g., the cell_PCH and URA_PCH states. For example, a downswitch of UE activity state within the URA_PCH state could trigger a reconfiguration to a longer DRX cycle.

For a UE connection having multiple bearers, the RAN node controls the UE activity level based on the activity level indicated from each of those bearers. In one non-limiting example implementation, the highest activity level determined from all of the connection bearers determines the particular activity level of the UE connection and the activity level command sent to the UE.

The following non-limiting example illustrates one way two classes of traffic may be assigned different inactivity time periods. The concepts described in this illustration may be used to assign different inactivity time periods for any number of traffic or service classes that have different tradeoffs between bearer response times and UE battery drain. One traffic class A relates to a multi-transaction-oriented type for which the activity state transitions should be set to optimize the bearer response times and thereby enhance the user experience. The other traffic class B includes single-transaction-oriented activity for which the activity state transitions should be set to reduce battery consumption of the UE. The example illustration is also based on a simplified QoS model such as a QCI.

For the network configuration in the policy control system, the network operator defines which type traffic falls into category A and which traffic falls into category B. Non-limiting examples of A class traffic (multi-transaction-oriented type traffic) include web traffic, virtual private network (VPN) traffic, IMS call control signaling, push-to-talk over cellular (PoC) traffic, e-mail access, unidentified Internet traffic, etc. Non-limiting examples of B class traffic (single-transactional type of traffic) include push e-mail notifications, instant messages, IMS subscribe/notify, IMS presence traffic, machine-2-machine communications, tariff metering traffic (electricity, water, etc.), infrequent but periodic surveillance pictures, etc. Another example of single-transactional type of traffic is keep-alive signaling of TCP connections or other protocols normally used to keep a context in a Network Address Translator (NAT) or a firewall alive. Such keep-alive messages do not indicate a higher probability of subsequent actions, and therefore, do not motivate staying long in the higher-activity state. Still another example of "single-transactional" type of traffic would be various messages sent by the operating system of a laptop/PC, such as IP/ICMP packets.

For each service or traffic type, the network operator also defines the normal QoS requirements. Based on above, the network operator defines QoS classes. Each QoS class is characterized not only by its high level QoS characteristics, but also by its inactivity timer setting. The network operator dimensions the total capacity of the network and configures the network nodes per QoS class. In particular, in the RAN node, inactivity timers are set per QoS class or per QCI to match either category A traffic/service or category B traffic/service.

In establishing each bearer, the QCI may be signaled from a policy control and charging rules function (PCRF) to the GGSN to the SGSN in the bearer PDP context setup. The QCI may then be signaled from the SGSN to the RNC in the RAB setup. The UE is configured with the radio bearer parameters derived from the QoS profile configured in the RAN node (likely an RNC but the node could be a base station/node B) for this particular QCI. Although not shown in FIG. 4, another database containing a QCI-to-radio bearer parameter mapping is employed.

For downlink traffic, data packets are mapped to the desired bearer/PDP context using packet filters in the GGSN. The bearer/PDP context is configured in the GGSN using the bearer's QCI determined based on operator policies for traffic classification. The downlink data packets are transmitted to the RNC on the corresponding RAB with the same QCI, the RAB having been configured in the SGSN. Uplink data packets are mapped in the UE to the desired bearer/PDP context having a certain QCI based on UE-local policies or rules downloaded from the network to the UE using an uplink packet filter. Uplink packets are queued for transmission to the radio access network on the corresponding RAB and Radio Bearer (RB).

Figure 5:
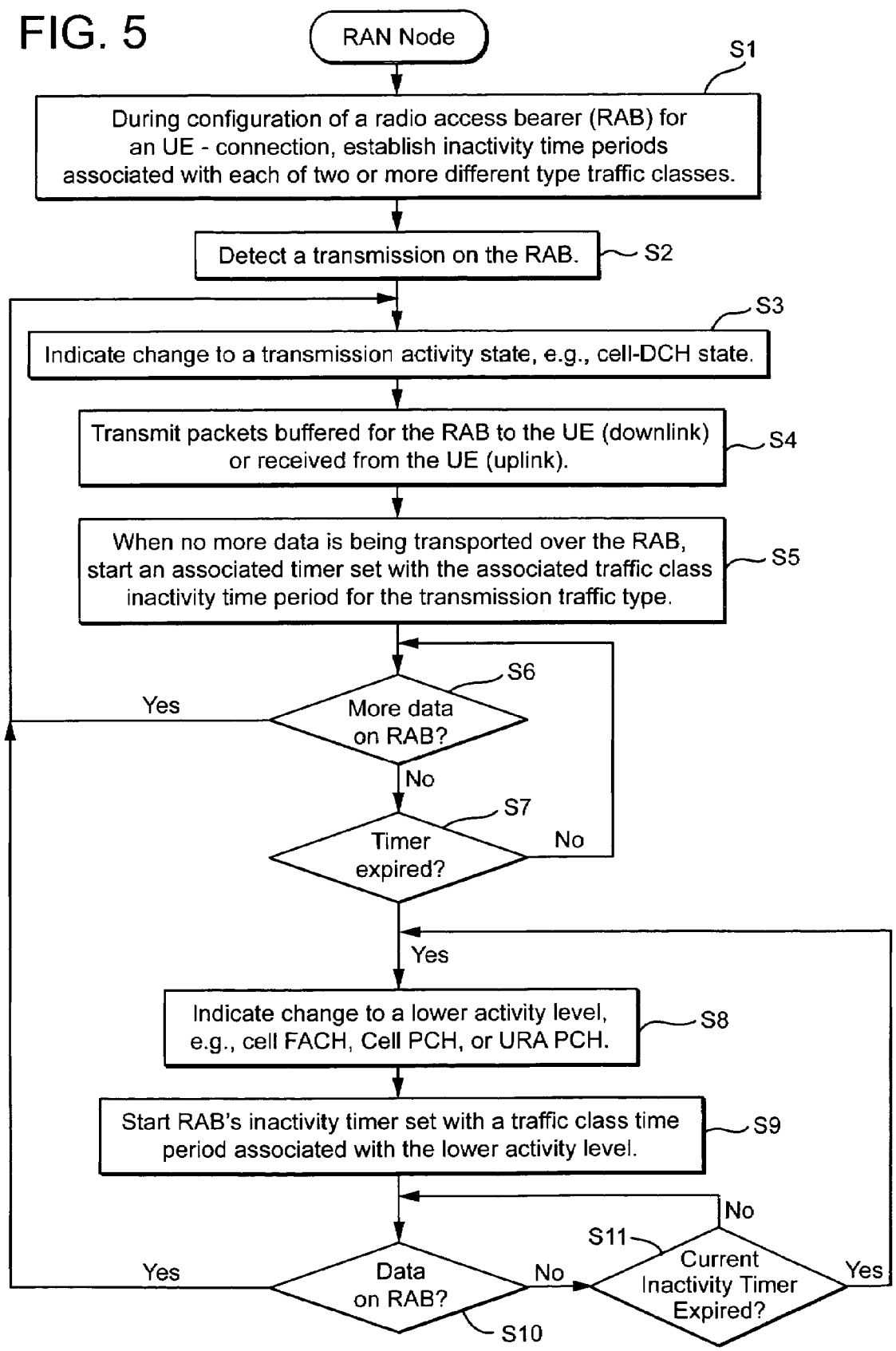
FIG. 5 is a flow chart illustrating non-limiting example procedures implemented in the RAN node.

The flowchart in FIG. 5 illustrates non-limiting example differentiated inactivity monitoring procedures for the RAN node. During configuration of a radio access bearer (RAB) for a UE connection, an inactivity time period is associated with each of two (or more) different type traffic classes (step S1). In the example above, the UE connection has two traffic classes: category A and category B. Transmission activity is monitored for each of the RABs for the UE connection. Assuming that the UE is in a lower activity state where there is no data to transmit, detecting data packets for transmission on an RAB (step S2) triggers an indication from the RAN node to the UE to change to a transmission activity state, e.g., to a Cell_DCH state (step S3). The packets buffered for that RAB are then transmitted to the UE (downlink) or received from the UE (uplink) (step S4). When no more data is being transported over the RAB, the RAN node starts an associated inactivity timer that has been set with a traffic class inactivity time period corresponding to the type of transmission traffic being transmitted over the RAB (step S5). A decision is made in step S6 whether there is more data to transmit over the RAB. If so, control returns to step S3. If not, a decision is made whether the associated inactivity timer has expired (step S7). If not, control returns to step S6. If so, the RAN node indicates the change to a lower UE activity level, e.g., Cell_FACH, Cell_PCH, or URA_PCH or even enter into a deep sleep state (step S8). At that point, the RAB's inactivity timer is set with a traffic class time period associated with that lower UE activity level (step S9). Monitoring is performed to determine whether there is any data to be transmitted on the RAB (in step S10). If so, control returns to step S3. If not, a decision is made whether the current inactivity timer has expired (step S11). If not, control returns to step S10. If so, control returns to step S8 for change to an even lower UE activity level.

Figure 6:
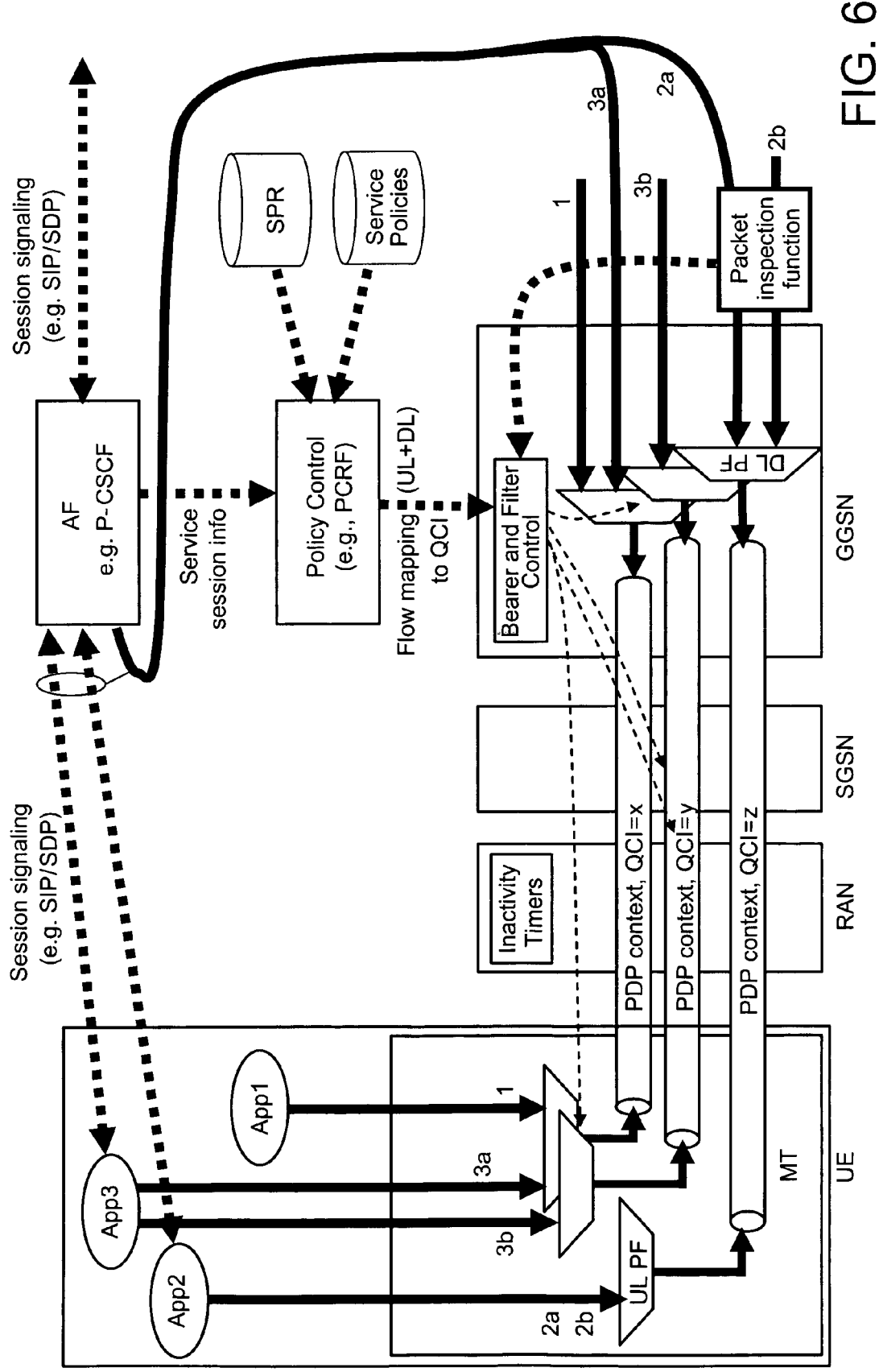
FIG. 6 is a function block diagram of a non-limiting UMTS example showing establishment and enforcement of QCI for different bearers in a connection.

FIG. 6 shows a non-limiting example implementation for three bearers for a UE connection that employs different QCI's x, y and z, each QCI having a different inactivity time period. The three bearers, shown as three PDP contexts, support a set of packet flows to/from three applications at the mobile terminal side, App1, App2, and App3. The setup of bearers for specific QCIs, and configuring Packet Filters (PF) in the GGSN for downlink, and in the MT for the uplink, is controlled by the Bearer and Filter Control function in the GGSN. The packet filters map incoming packets to a bearer based on IP header information, such as IP address, port number, protocol ID or differentiated services code point (DSCP) information.

Application App1 uses a bearer with a long inactivity timer, and does not use any session level signaling with the IMS network. App1 could be, for example, a web browser type of application. The data packets (packet flow "1") could be mapped to a default bearer which does not require control of specific packet filters for this application.

Application App2 uses only a bearer with a short inactivity timer. App2 could be, for example, a push-mail client application. App2 generates two types of packet flows: packet flow "2a" includes IMS SIP signaling between the App2 and the Proxy-CSCF of the IMS network (and ultimately to some application server in the IMS network). These SIP messages do not trigger any signaling to the PCRF, and thus no dynamically created mapping (policy) rules are installed from PCRF to GGSN.

The SIP messages themselves are mapped to the suitable bearer by a variety of the alternatives. A first mapping alternative distinguishes this flow of SIP messages on a separate IP address+port number and configures the uplink and downlink packet filters in the MT and GGSN, accordingly for this bearer. A second mapping alternative marks the packets of this particular flow of SIP messages with a specific differentiated services code point (DSCP) or TOS value in the P-CSCF or a packet-inspection function (downlink), and in the App2 client in the terminal (uplink), and configuring the packet filters (downlink: GGSN and uplink: MT) with the corresponding DSCP value. The P-CSCF or the packet inspection function would identify the particular flow of SIP messages by interpreting parts of the SIP message, such as the message type (SIP NOTIFY or SIP MESSAGE messages), or the source/destination addresses (e.g. identifying the server orignating the message), or a service identifier (e.g. indicating "Instant Messaging" or "SIP Push" or similar). A third mapping alternative identifies the flow of packets in the packet inspection function as above, and then triggering the configuration of the filter through the Bearer and filter control function to define filters based on the current IP address and port numbers. A fourth mapping alternative performs the packet inspection as above internally in the GGSN for direct mapping to a bearer.

Application App2 also generates another packet flow "2b" which may represent the TCP connection for retrieval of a mail to a P-IMAP dispatcher/IMAP server. Again, there are different example alternatives for how the packet flow is mapped to the desired bearer. A first mapping alternative is to configure the packet filters so that packets to/from the IP address of the IMAP server are mapped to the desired bearer. In a second mapping alternative, the IMAP server marks the packets in the downlink direction with a DSCP value, and the push-mail client marks the uplink packets with a DSCP value. The packet filter are configured so that packets with this DSCP value is mapped to the desired bearer. In a third mapping alternative, a packet inspection function within or outside the GGSN identifies the flow of packets as being packets to be treated with a short inactivity timer. The packet inspection function thus marks the packets with a short inactivity timer DSCP value (downlink), or alternatively triggers an update of the packet filters via the bearer and filter control function in the GGSN such that the current flow of IP packets is mapped to the desired bearer.

Application App3 uses one bearer with a long inactivity timer for SIP session setup signaling (packet flow "3a"), and another bearer for a media flow (packet flow "3b") being set up with the SIP session setup signaling. This could represent a multimedia telephony application. The SIP session signaling (packet flow "3a") is mapped to a bearer with long inactivity timer, either by default or by marking packets with a DSCP value and defining packet filters with this value, by configuring such a mapping between the application client and the MT in the terminal (uplink), or by defining a filter based on the P-CSCF IP address in the GGSN (downlink). Different SIP messages for one and the same IMS mobile terminal thus may be mapped to different bearers in this way.

The media flow (packet flow "3b") is mapped to a bearer optimized by the policy control functions in the network to carry the actual media packets (e.g., voice packets). The P-CSCF forwards session service information derived from the SIP signaling to the PCRF. This information includes for instance service identification ('voice telephony') and definition of the media flows (e.g., voice bit rate, uplink/downlink IP addresses, and port numbers). Based on this session service information and on operator-configured mapping rules, the PCRF maps the media flow to a suitable QoS class (QCI), and signals this mapping to the GGSN in a dynamic policy rule. The GGSN then creates the packet filters for the bearer with the requested QCI, and installs the downlink filter in the GGSN and the uplink filter in the MT. When the media flow packets arrive, they are mapped to the desired bearer using these packet filters. The inactivity timer for a bearer used for a media flow may be fairly short to allow the control signaling to determine when the activity state is switched. However, there may be reasons to allow a longer inactivity timer for certain types of media flows, e.g., if pausing a video streaming flow only for a short while, the activity state could be kept high for a while to allow quick resumption.

In FIG. 6, the SIP signaling between App2/App3 and the P-CSCF is carried in the packets flows 2a/3a, respectively, via the MT and the GGSN.

Figure 7:
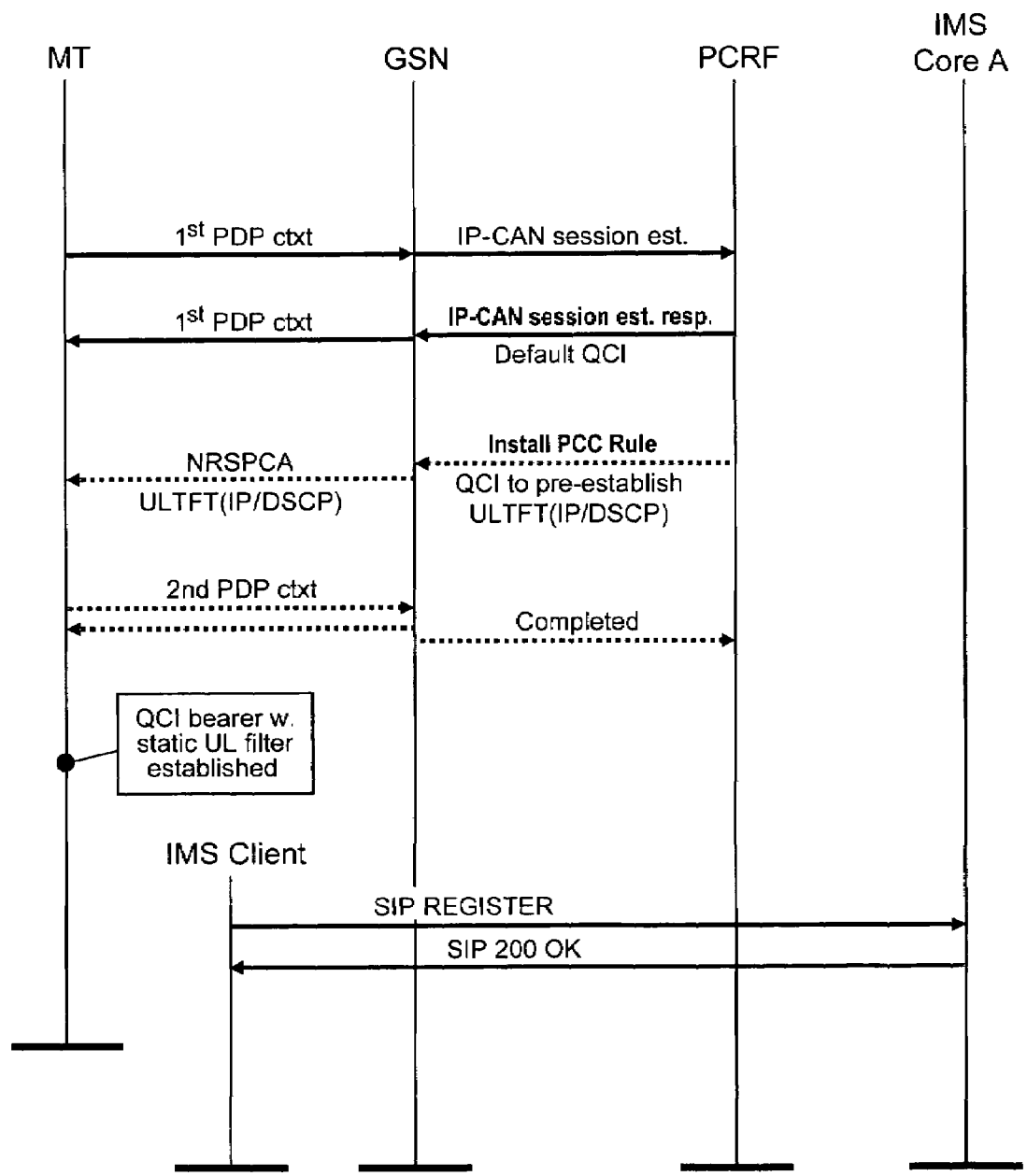
FIG. 7 is a non-limiting example signaling diagram for establishing an IP connection having a particular QCI.

For all applications described above, the bearer with the desired QCI could be set up in advance (e.g., using the setup sequence of FIG. 7). Alternatively, the GGSN may set the bearer up dynamically using the signaling sequence shown in FIG. 9 described below.

Inactivity timers may be set differently for uplink and downlink packet transmission. Alternatively, if it is not possible to control the mapping of uplink packets to the correct bearer and inactivity timer, then the inactivity timers may be differentiated only on downlink traffic by setting the inactivity timers for uplink traffic to always be fairly short. In that case, the inactivity timers for downlink traffic may be either short or long. And if there is a request to switch down to a lower activity state, the switch preferably occurs only when both the uplink and downlink inactivity timers have expired.

The QCI may be selected differently for different subscribers using the same application in order to different inactivity timers for those different subscribers, e.g., that may be using different types of UEs. This QCI selection may change if the network (e.g., PCRF) knows whether the mobile terminal switches from battery power to AC power or vice versus.

The inactivity timer used to deliver a specific service may also be dynamically changed depending on the data volume transmitted. One example is that if video clips of a predefined length is delivered, then the inactivity timer during delivery is set longer to allow the user to pause the play out but receive a quick resumption of play out. Once the video clip is completed, the inactivity timer could be switched to a shorter value, e.g., by remapping a packet flow from one QCI to another during delivery, modifying the QCI of a bearer during delivery, or by releasing the bearer after the delivery of the video clip, thereby forcing the inactivity timer to be released.

The inactivity timer for the selected QCI for a bearer may also be adjusted based on measured statistics of the traffic mapped to the bearer. This adjustable has one example application to UE terminals using only a default bearer. Example statistics may include correlation properties, such as probability of additional traffic within certain time conditioned on traffic activity. The statistics may be collected during the IP network connection or stored per subscriber. Based on the collected statistics, a QCI for a suitable inactivity timer is selected when setting up the default bearer, or the QCI of the bearer is modified dynamically during the IP network connection.

FIG. 7 illustrates a non-limiting, example set-up of an IP connection with a UE. The UE first initiates the setup of a first bearer (PDP context), which implies allocation of an IP address to the UE. The network assigns a default QoS class (QCI) to this first bearer. Based on operator-provided rules in the PCRF, a specific bearer with another QCI is setup from the start. This other QCI corresponds to another inactivity timer in the RAN. Normally, the default QCI corresponds to a long timer, and this other QCI to a short timer. Based on the decision to set up a second bearer, the PCRF sends a message to the GGSN (Install Policy Rule), indicating the desired QCI to pre-establish for the new bearer. Also included is the uplink packet filter to be installed in the UE for this bearer (UL Traffic Flow Template), which at this point in time is either empty, is based on a static IP address, or is based on a DSCP value. The GGSN then proceeds with a sequence as described in detail in FIG. 9 described below. When completed, the GGSN indicates this with a message to the PCRF. This signaling is shown with dashed arrows, since the pre-establishment of this second bearer is optional—the bearer could alternatively be set up when the network detects the need to transfer data on a specific QCI. Finally, the IMS client in the UE registers with the IMS network.

Figure 8:
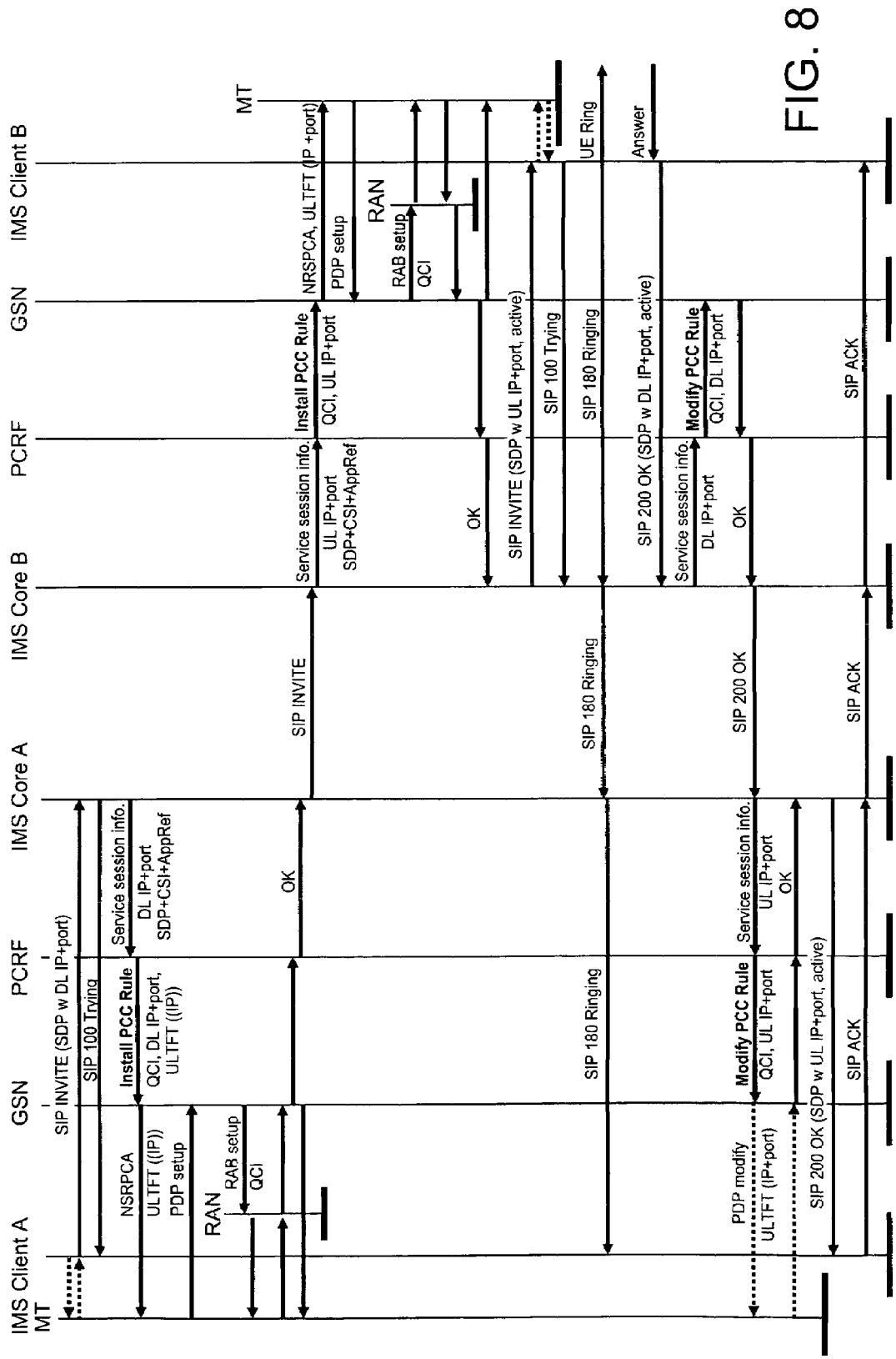
FIG. 8 is a more detailed but still non-limiting example signaling diagram.
Figure 9:
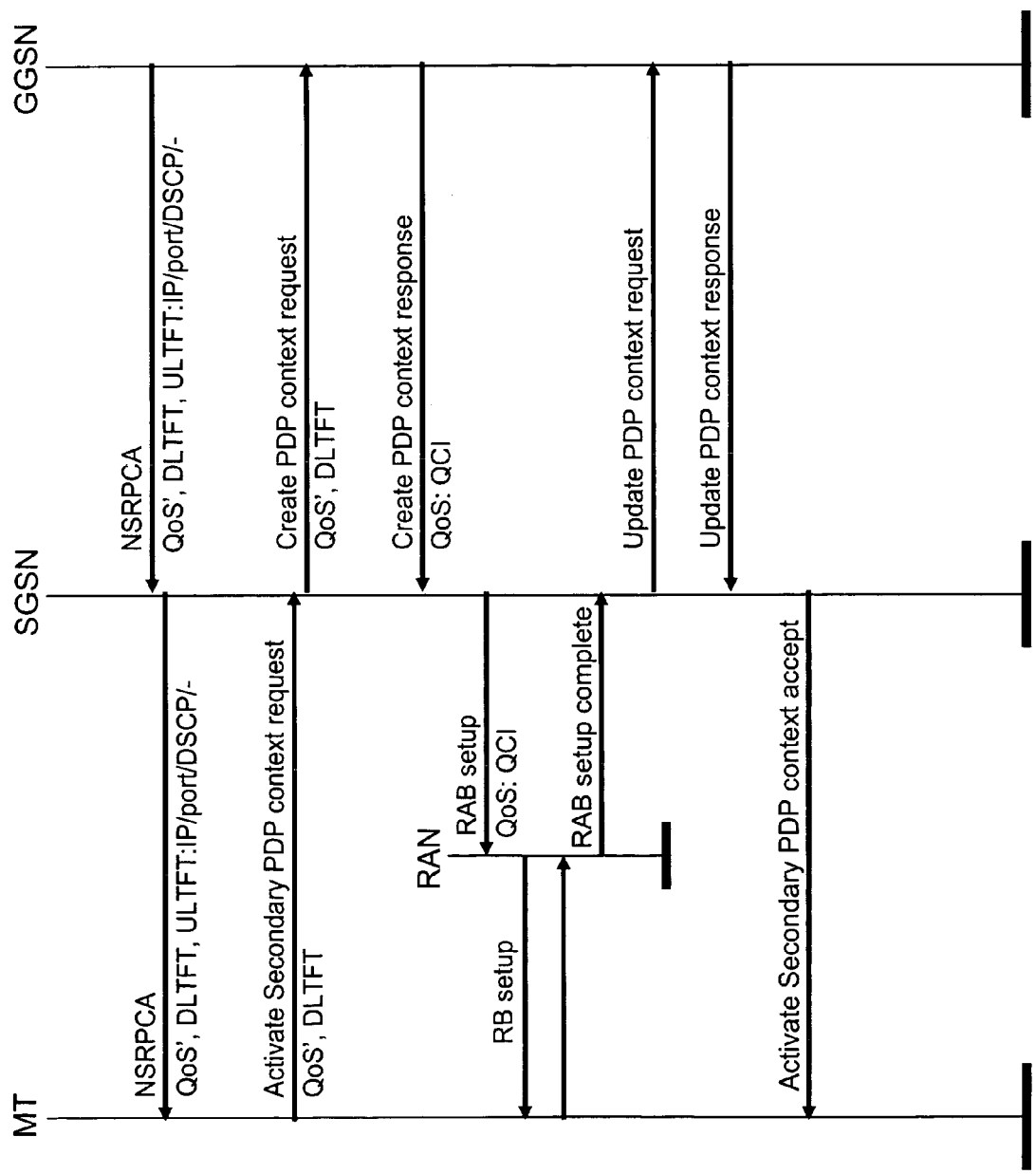
FIG. 9 is a non-limiting example signaling diagram showing activation of a PDP context in which a QCI for the PDP context is established.

FIG. 8 illustrates a detailed signaling diagram that shows the session signaling to set up a multimedia call between the UE and a remote UE corresponding to App3 of FIG. 6. The originating IMS client application initiates the session setup with a SIP INVITE to the IMS Core A. The IMS Core (P-CSCF) forwards relevant session service information to the PCRF, which maps the media flow to a QCI and installs a corresponding policy rule in the GGSN. The QCI determines the inactivity timer used for the media flow bearer as configured in the RAN. The PCRF may select different QCIs to achieve different inactivity timers depending e.g., on media flow type or subscriber data. The GGSN evaluates if there is already a bearer with that QCI (in this example there is not). The GGSN triggers the setup of the new bearer, a detailed example of which is shown in FIG. 9. The corresponding actions occur on the terminating side. Once the terminating user answers the call, the IP+port information for the media flow in direction to that user is known, and the packet filters are updated accordingly (downlink filter on terminating side and the uplink filter on the originating side).

FIG. 9 shows the details of a non-limiting example signaling sequence to set up a bearer from the network. The trigger for the GGSN to start this sequence is either a request from the PCRF to set up a new bearer with certain characteristics or detection of traffic (uplink or downlink) that according to a predefined rule in the GGSN should receive these characteristics. The former case includes the example shown in FIG. 7, where the bearer is already setup when connecting to the IP network. The latter case includes packets with certain IP address and port numbers set, a certain differentiated services code point (DSCP) value in the IP header, certain higher level protocol characteristics revealed through a packet inspecting function, or a combination of any of these.

Once triggered, the GGSN sends a request via the SGSN to the mobile terminal (MT) called a Network Requested Secondary PDP Context Activation (NSRPCA). This request includes an uplink packet filter, the uplink (UL) Traffic Flow Template (TFT), which can be empty and filled-in later, or the filter may be based on IP address, IP port number, IP protocol ID, IP DSCP values, or any combination thereof. The uplink filter is stored in the MT associated with the bearer to be setup. A QoS' parameter and a Downlink(DL) TFT are included in the secondary PDP context activation triggered by the MT's sending the NRSPCA.

The secondary PDP context activation is sent to the SGSN, which according to known procedures, forwards the request to the GGSN using a Create PDP Context Request message. The GGSN associates this message with the earlier NRSPCA using the QoS' and/or DL TFT. The GGSN can now change the QoS (if e.g. the MT has altered the requested QoS'), and include the final QoS as a QCI value, in the response to the SGSN. The SGSN then requests a radio access bearer from the radio access network (RAN) including the QCI value. The RAN performs the necessary radio bearer signaling with the MT and responds to the SGSN, which completes the setup by signaling to the MT and the GGSN.

Figure 10:
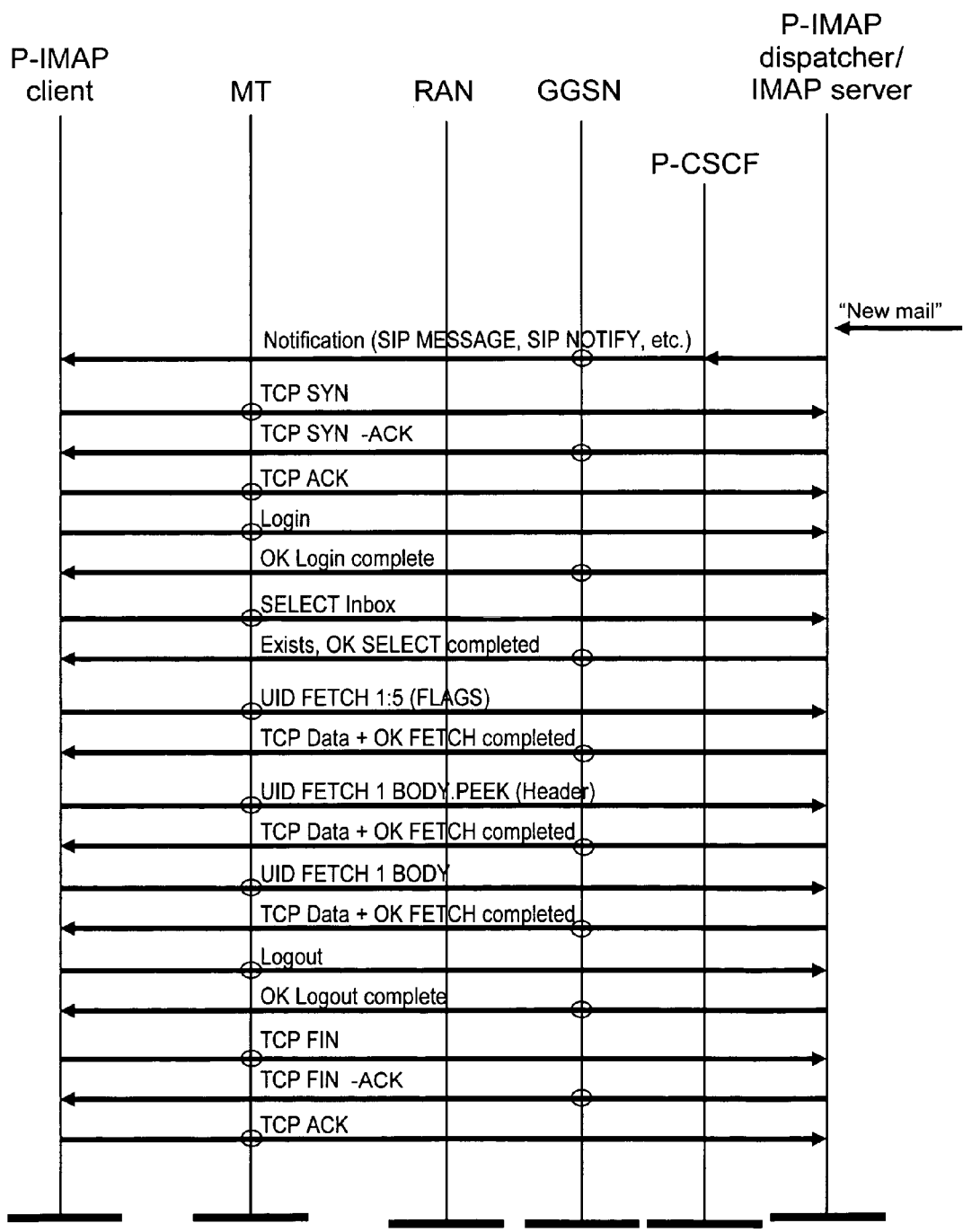
FIG. 10 is a non-limiting example signaling diagram for the delivery of a push email to the mobile terminal.

FIG. 10 shows details of a non-limiting example signaling sequence for the delivery of a push e-mail to the mobile terminal. This sequence is triggered by the arrival of a new e-mail to the IMAP (mail) server, which also acts as a Push-IMAP (P-IMAP) dispatcher. The P-IMAP dispatcher first notifies the Push-IMAP client in the mobile terminal about the arrival of a new mail using (in this example) either a SIP MESSAGE message or a SIP NOTIFY message. An alternative (not shown) is to send the notification via short message signaling (SMS). As IMS SIP signaling, this SIP notification message is routed via the Proxy-CSCF, which marks the packets to the GGSN to be differentiated from the IMS SIP signaling used to set up calls. This "marking" is a DSCP value in this example. The GGSN thus maps the packets to a bearer with a short inactivity timer which is shown as a circle on the message in FIG. 10.

The notification triggers the P-IMAP client to open a TCP connection, log-in to the IMAP server/P-IMAP dispatcher, select an in-box, retrieve a list of mails, retrieve the header of the new mail, retrieve the full body of the new mail, log-out from the server, and close the TCP connection. All these messages are mapped to a bearer with a short inactivity time period by the GGSN (downlink) and the MT (uplink). In the downlink, this mapping is ensured either by the P-IMAP dispatcher/IMAP server making a packet marking (such as DSCP), by configuring the GGSN to filter on the IP address of the P-IMAP dispatcher/IMAP server, or by a packet inspection function within or outside the GGSN identifying packets as being push-mail packets. In the uplink, the mapping can be done by configuring the P-IMAP client application to set a certain DSCP value on its packets and ensuring that the uplink packet filter (UL TFT) is defined so that packets with this DSCP value are mapped to a specific bearer. Alternatively, uplink packets may not be differentiated with regards to inactivity timers, and the RAN is configured with short inactivity timers for the uplink direction. In that case, only downlink activity or inactivity triggers state transitions. Although the signaling sequence to push an e-mail to the mobile client consists of multiple messages, it is executed as one batch of messages triggered by a single event (arrival of a new mail).

Figure 11:
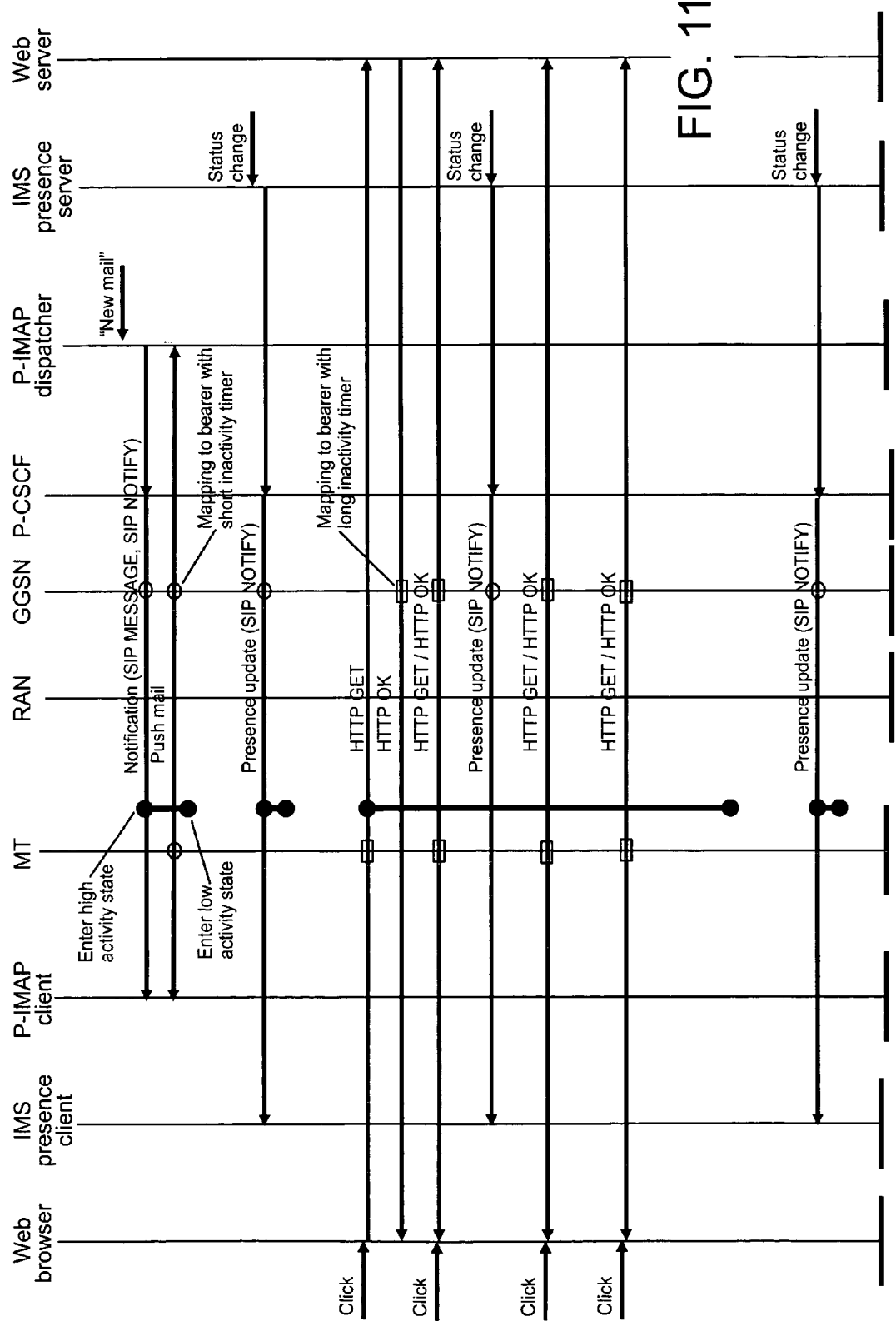
FIG. 11 is a non-limiting example signaling diagram where the mobile terminal is running three applications in a session that uses both short and long inactivity timers.

FIG. 11 shows a use case with three applications in the mobile terminal. The circles show that packets are mapped to a bearer with a short inactivity timer whereas the rectangles show that packets are mapped to a bearer with a long inactivity timer in the mappings done in the GGSN (downlink) and the MT (uplink). Initially, the mobile terminal is in a low-activity state. First, a new mail arrives, triggering a push of the mail according to FIG. 10. This switches the connection of the mobile terminal to a high-activity state, indicated by the vertical thick line. When the mail push is completed, the connection is soon switched to a low-activity state (push mail uses the bearer with short inactivity timer), which is indicated by the ending of the thick vertical line.

Next, an IMS presence server is informed about the status change of a friend of the UE user (e.g., the friend is now on-line). The IMS presence server thus creates a SIP NOTIFY message to update the presence information in the client of the terminal. This message is sent via the Proxy-CSCF. As for the push mail notification, the packets carrying this SIP message are marked by the P-CSCF to be mapped by the GGSN to the bearer with a short inactivity timer. The transfer of this SIP NOTIFY message may also trigger an immediate response from the presence client, which is not shown in the figure. The mobile terminal connection is switched to a high activity state for transferring the SIP message(s), but shortly after completing the transaction, it reverts to a low activity state.

Next, the user starts a web browsing session, by "clicking" on a link in the browser (or entering an address). This triggers a HTTP GET message to the web server and a response back. (Not shown are other messages potentially needed before HTTP signaling, such as TCP connection setup and DNS query.) For each mouse click (or other user interaction), there may be multiple exchanges of HTTP messages to get different objects of a web page. In FIG. 1, they are shown as one transaction to simplify the illustration. The HTTP messages are mapped to a bearer with a long inactivity timer illustrated with a rectangle. In this example, no special packet filters are needed for this, since HTTP messages are mapped to a default bearer which is configured with the long inactivity timer. Thus, the transfer of HTTP packets switches the connection to a high activity state. For the first click by the user, this switch may incur an extra delay in the response time. But then the connection will remain in this state while the user is reading the web page so that for subsequent clicks by the user, the connection is already in the high activity state, and the response times are shorter.

While the connection is in an high activity state due to traffic detected on the bearer with a long inactivity timer, there may be traffic sent on the bearer with a short inactivity timer (shown as another presence update). This does not change the state of the connection. Only when there has been no web browsing data for a longer period of time is the connection switched back to a low activity state. Finally, another presence update is shown, after which the connection is quickly switched back to a low activity state.

For the WCDMA UTRAN examples above, the differentiation of traffic and inactivity time periods is performed on a per bearer level, where the bearer includes the PDP context and the RAB. But the principles described above may be applied in other ways and in other type networks. For example, another radio access network may not implement inactivity time period on a bearer level. Instead, a per-packet indication of QoS class (or "traffic class") might be used. In that case, the inactivity timer setting, traffic activity monitoring, and activity level determination may be performed per QoS class. Each QoS class could then be treated in an analogous fashion as a bearer as described earlier. Other variations are envisioned as well.

In the non-limiting examples above, the type of traffic is determined by identifying a specific application, which is categorized as one of the traffic types. In another non-limiting example application, the traffic type is detected by the network by measuring statistics of the traffic related to a subscriber. The statistics may include the probability of subsequent traffic activity within a period of time conditioned on a previous traffic activity. The statistics may be stored in a database in the CN, e.g., in the PCRF or Subscriber Repository. This method also applies to a case where a mix of application traffic is carried on one general-purpose bearer. If for one subscriber, this traffic mix is dominated by "single-transaction" type of traffic, then the QCI, and thus indirectly the inactivity timer, for this general purpose bearer is set a relatively short value. If for another subscriber, this traffic mix is dominated by "multi-transaction" type of traffic, then the QCI, and thus indirectly the inactivity timer, for this general purpose bearer is set to a relatively long value.

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. No claim is intended to invoke paragraph 6 of 35 USC §112 unless the words "means for" are used.

The invention claimed is:

1. A method for use in mobile radio communications where there is a connection with a mobile terminal, comprising:
   determining a type of traffic associated with the connection;
   determining one of multiple different inactivity time periods based on a type of traffic associated with the connection and to balance for the traffic type response time and resource usage requirements for the connection with power consumption by the mobile terminal; and
   providing information regarding the one inactivity time period for use in monitoring whether the one inactivity time period has expired without activity being detected on the connection for that type of traffic.

2. The method in claim 1, wherein traffic types include a multi-transactional type of activity and a single-transactional type of activity, and wherein the inactivity time period for the multi-transactional type of activity is longer than the inactivity time period for the single-transactional type of activity.

3. The method in claim 1, wherein traffic types include web traffic, VPN traffic, IMS call control signaling, PoC traffic, e-mail access, unidentified Internet traffic, push e-mail notification and delivery traffic, instant messaging traffic, IMS subscribe and notify traffic, IMS presence traffic, machine-to-machine traffic, tariff metering traffic, protocol keep-alive signaling, or periodic surveillance video traffic.

4. The method in claim 1, further comprising:
   defining a protocol parameter indicating the one inactivity time period.

5. The method in claim 4, wherein data traffic carried by the connection is associated with a quality of service class and a parameter indicating quality of service class is used as the protocol parameter indicating the one inactivity time period.

6. The method in claim 4, further comprising:
   communicating the protocol parameter indicating the one inactivity time period in signaling used to establish or modify one or more bearers of qualities of service associated with the connection.

7. The method in claim 4, further comprising:
   communicating the protocol parameter indicating the one inactivity time period in data packets associated with the connection.

8. The method in claim 1, wherein the traffic type is determined by inspecting the content of packets associated with the connection in a mobile core network and classified according to one or more mobile core network operator policies.

9. The method in claim 1, wherein the traffic type is determined by a policy control node involved in authorizing media flows established by session level signaling for the connection, and wherein the one inactivity time period is provided to a radio access network which determines whether the one inactivity time period has expired without activity of the type of traffic being detected on the connection.

10. A method for use in mobile radio communications, comprising:
    establishing multiple service classes for communicating data with one or more mobile terminals;
    determining a type of traffic associated with each service class;
    establishing an associated inactivity time period for each service class that balances response time and resource usage requirements associated with the traffic type with mobile terminal power consumption; and
    determining whether the associated inactivity time period has expired without having detected traffic activity for each service class of the connection.

11. A method for use in mobile radio communications where there is a connection with a mobile terminal, comprising:
    receiving an indication of a type of traffic associated with the connection and one of multiple different inactivity time periods determined based on a type of traffic associated with the connection, and
    determining whether the one inactivity time period has expired without activity of the type of traffic being detected on the connection,
    wherein when multiple bearers are established for the connection, the method further comprises:
    establishing one of the multiple different inactivity time periods for each bearer in the connection based on a type of traffic associated with each bearer, and
    changing the first mobile state to a lower power state if associated inactivity timers for all bearers established for the connection have expired.

12. The method in claim 11, wherein the mobile terminal is operating at a first one of multiple mobile states further comprising:
    sending information for changing the first mobile state of the mobile terminal to a lower power consuming mobile state if the one inactivity time period has expired.

13. The method in claim 12, wherein each mobile state is defined according to one or more of the following: a level of radio resources assigned to the connection, a level of power consumption for the mobile terminal, or a delay associated with transition to a mobile state where data transmission can occur.

14. The method in claim 11, wherein when multiple qualities of service are established for the connection, the method further comprises:
establishing one of the multiple different inactivity time periods for each quality of service, and
changing the first mobile state to the lower power state if associated inactivity timers for all qualities of service established for the connection have expired.

15. Apparatus for use in a mobile radio communications system where there is a connection with a mobile terminal, comprising electronic circuitry configured to:
determine a type of traffic associated with the connection;
determine one of multiple different inactivity time periods based on a type of traffic associated with the connection that balances response time and resource usage requirements associated with the traffic type with mobile terminal power consumption; and
provide information regarding the one inactivity time period for use in monitoring whether the one inactivity time period has expired without activity being detected on the connection for that type of traffic.

16. The apparatus in claim 15, wherein traffic types include a transactional type of activity and a single message type of activity, and wherein the inactivity time period for the transactional type of activity is longer than the inactivity time period for the single message type of activity.

17. The apparatus in claim 16, wherein traffic types include web traffic, VPN traffic, IMS call control signaling, PoC traffic, e-mail access, unidentified Internet traffic, push e-mail notification and delivery traffic, instant messaging traffic, IMS subscribe and notify traffic, IMS presence traffic, machine-to-machine traffic, tariff metering traffic, protocol keep-alive messages, or periodic surveillance video traffic.

18. The apparatus in claim 16, wherein the electronic circuitry is further configured to define a protocol parameter indicating the one inactivity time period.

19. The apparatus in claim 18, wherein data traffic carried by the connection is associated with a quality of service class and a parameter indicating the quality of service class is used as the protocol parameter indicating the one inactivity time period.

20. The apparatus in claim 15, wherein the electronic circuitry is further configured to communicate the protocol parameter indicating the one inactivity time period in signaling used to establish or modify one or more bearers of qualities of service associated with the connection.

21. The apparatus in claim 15, wherein the electronic circuitry is further configured to communicate the protocol parameter indicating the one inactivity time period in data packets associated with the connection.

22. The apparatus in claim 15, wherein the electronic circuitry is further configured to determine the traffic type by inspecting the content of packets associated with the connection in a mobile core network and classified according to one or more mobile core network operator policies.

23. The apparatus in claim 15 implemented in a policy control node involved in authorizing media flows established by session level signaling for the connection, and wherein the policy control node is configured to provide the one inactivity time period to a radio access network.

24. A radio access network node for use in mobile radio communications where there is a connection with a mobile terminal, comprising electronic circuitry configured to:
receive an indication of a type of traffic associated with the connection and one of multiple different inactivity time period determined based on a type of traffic associated with the connection, wherein the one inactivity time period balances for the traffic type response time and resource usage requirements for the connection with power consumption by the mobile terminal, and
determine whether the one inactivity time period has expired without activity of the type of traffic being detected on the connection.

25. The radio access network node in claim 24, wherein the mobile terminal is operating at a first one of multiple mobile states and the electronic circuitry is further configured to send information for changing the first mobile state of the mobile terminal to a lower power consuming mobile state if the one inactivity time period has expired.

26. The radio access network node in claim 24, wherein when multiple bearers are established for the connection, the electronic circuitry is further configured to:
establish one of the multiple different inactivity time periods for each bearer in the connection based on a type of traffic associated with each bearer, and
send information to the mobile radio indicating a change from the first mobile state to the lower power state if associated inactivity timers for all bearers established for the connection have expired.

27. A radio access network node for use in mobile radio communications where there is a connection with a mobile terminal, comprising electronic circuitry configured to:
receive an indication of a type of traffic associated with the connection and one of multiple different inactivity time period determined based on a type of traffic associated with the connection, and
determine whether the one inactivity time period has expired without activity of the type of traffic being detected on the connection,
wherein when multiple qualities of service are established for the connection, the electronic circuitry is further configured to:
establish one of the multiple different inactivity time periods for each quality of service, and
send information to the mobile radio indicating a change from the first mobile state to the lower power state if associated inactivity timers for all qualities of service established for the connection have expired.

* * * * *